July 10, 1956     F. FAULHABER ET AL     2,753,777
ROLLFILM CAMERA

Filed Feb. 5, 1952     3 Sheets-Sheet 1

INVENTOR.
FRITZ FAULHABER
ERNST CAMMIN
ERWIN DORING
BY Mock + Blum
ATTORNEYS

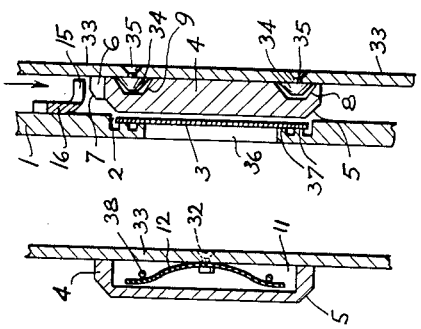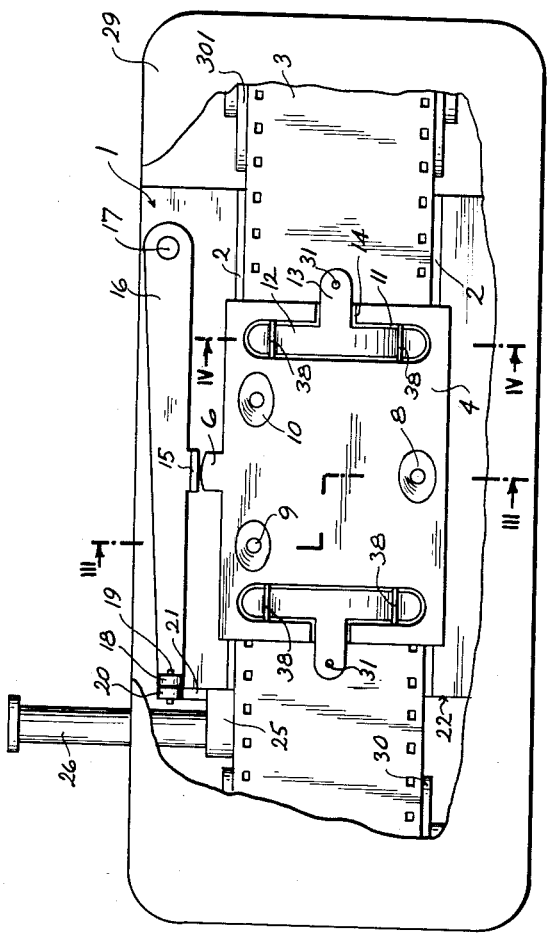

July 10, 1956

F. FAULHABER ET AL 2,753,777

ROLLFILM CAMERA

Filed Feb. 5, 1952

INVENTORS
FRITZ FAULHABER
ERNST CAMMIN
ERWIN DORING

BY Mock + Blum

ATTORNEYS

United States Patent Office 2,753,777
Patented July 10, 1956

2,753,777

ROLLFILM CAMERA

Fritz Faulhaber, Schonaich (Brenz), Boblingen, and Ernst Cammin and Erwin Doring, Braunschweig, Germany, assignors to Voigtlander, A. G., Braunschweig, Germany, a corporation of Germany Application February 5, 1952, Serial No. 269,998

Claims priority, application Switzerland February 19, 1951

14 Claims. (Cl. 95—31)

This invention relates to roll-film cameras provided with a film pressure plate and has particular relation to roll-film cameras of this type, in which the pressure plate is automatically lifted from the film during advance of the latter in order to avoid friction between the advancing film and pressure plate.

In constructions of this type it is essential that holding of the film in flat condition by the action of the pressure plate, is secured during exposure. In a known construction suggested for this purpose, the pressure plate is provided with a spring arranged on a stationary part of the camera, and the pressure plate has in its center a rib, on which the projection of a slide member acts so that a wedged pressure effect is obtained.

According to the present invention, a principle different from that of said known construction is used.

The primary object of this invention is to provide means for causing the pressure plate to carry out a combined movement composed of a slight movement which is perpendicular to the plane of the film and a movement substantially parallel to the plane of the film.

Another object of the present invention consists in providing means for bringing about said combined movement by transmission from means for controlling advance of the film, to the film pressure plate.

It is also an object of the present invention to provide releasable connection between the means for controlling advance of the film and the film pressure plate, in order to break the connection between said control means and the pressure plate when the back wall of the camera is open.

A further object of this invention is to provide an arrangement of the before mentioned type, in which the film pressure plate is fastened to the back wall of the camera and is automatically removed from the film when said back wall is opened.

Still another object of the invention is an arrangement of the above mentioned type, in which means are provided for securing automatic adjustment of the film pressure plate to a position in which the pressure plate exerts a substantially uniform pressure on the film over the entire surface of the film window.

Other objects and the advantages of the invention will be apparent from the appended claims and drawings and the following specification which describes, by way of example and without limitation, some embodiments of the invention.

According to the present invention, the film pressure plate is releasably coupled with the film control mechanism in such manner that connection between the film control mechanism and film pressure plate is interrupted when the back wall of the camera is opened.

The releasable coupling and/or the elements necessary for coupling may be of varying construction. According to a simple embodiment, the elements forming the connection consist of the film pressure plate, on the one hand, and a transmission member connected with the film control mechanism and causing movement of the pressure plate, on the other hand. In this case, according to a preferred embodiment, the pressure plate is provided, for example, with a projecting part extending beyond the edge of the plate, said projecting part being provided with a beveled surface serving as a giude surface for the transmission member. The coupling or transmission member which becomes connected with the film pressure plate during closing of the camera, preferably consists of a lever, one end of which is pivotally fastened to the camera. Said lever has a part, preferably a bent portion, arranged for example in the middle of the lever and acting on the beveled part of the pressure plate; moreover, said lever is connected, for example at its other end, with the film control mechanism. Connection of this lever, which serves as a coupling member with the film control mechanism, can be brought about in a simple manner by means of a double-armed lever. One arm of the latter is under spring impulse, and presses its other arm against the coupling lever, and thus presses the coupling lever over the coupling point against the pressure plate, i. e., the beveled portion of the latter, so that the plate exerts pressure against the film. The spring acting on the double lever, i. e. the spring which brings about motion of the pressure plate, can be a spring which acts on the film control mechanism, the spring force being preferably transmitted over an abutting part connected with the control handle.

In actuating the mechanism according to the present invention, the pressure plate is moved away from the back wall of the camera in about parallel direction with and perpendicularly toward the film. However, the possibility exists that, owing to unilateral play, which cannot be completely eliminated in production, or owing to slight inaccuracies caused by tolerances, the back wall of the camera is not entirely parallel to the direction of the film. The consequence is that the film is not uniformly pressed to the surface of the picture window and, as the film has the tendency to arch, it will project from the plane of the picture, at the portions not firmly pressed against the window. This will cause the occurrence of blurred portions in the photographic picture.

This difficulty is overcome, according to a further embodiment of the invention. In this embodiment illustrated in Figures 7–10, the pressure plate is supported at a point or along a line, by inclined surfaces, which are located between the pressure plate and back wall of the camera, and used for bringing about pressing of the plate, so that the plate is capable of swinging during pressing. This arrangement has the advantage that, in pressing against the film, the pressure plate automatically adjusts itself to a position in which pressure is exerted uniformly on the film over the entire surface of the picture window. Therefore, no portion of the film can be outside of the image plane.

The presence of one or two points serving as inclined surfaces is, in general, sufficient. Such points consist, for example, of pointed conical projections, such as pointed conical rivet heads, or the like; they are fastened to the pressure plate or to the back wall of the camera and co-act with corresponding, preferably likewise beveled, elements provided on the corresponding other part, or on an intermediate part, such as a slide.

If two or more supporting points are used, they should be arranged according to the invention in a straight line, so that the pressure plate can carry out, if necessary, a swinging movement about the connecting line of the supporting points, in addition to the combined movement in parallel and perpendicular direction to the plane of the film. A further adjustment may become necessary if not only one of two parallel edges of the pressure plate must be further advanced than the other, but additionally a third edge, i. e. if, for example, the back wall of the camera is, even slightly, in a spatially inclined position. In this case too, the pressure originating from the film control mechanism causes the elastically held plate to press uniformly against the film. This is effected by a more extended action of the inclined surfaces, which brings about a wedge effect, on the transmission member preferably likewise provided with elements having inclined surfaces. If only one inclined surface and only one registering element for bringing about the wedge effect, is provided between the film pressure plate, on the one hand, and the back wall of the camera or the intermediate organ, for example a slide, on the other hand, the combined movement and the necessary swinging, will be effected at such single point. The pressure originating from the film control mechanism causes displacement of the pressure plate, by the wedge effect, toward the film and causes, in case of unilateral movement, swinging until the pressure plate bears against the film uniformly over the entire surface of the window.

The film pressure plate is fastened to the back wall of the camera by means of one or more springs, so that the springs, which are preferably leaf springs, permanently tend to draw the pressure plate toward the back wall of the camera. Said springs are designed and arranged to allow the above mentioned combined movement during pressing of the plate toward the film. These springs and said slide provided with inclined projections, are preferably arranged in one or several recesses of the pressure plate, and are thus concealed. In order to save space in the interior of the camera, the back wall of the camera may be curved outward.

The appended drawings illustrate some embodiments of the invention, to which the invention is not limited. In the drawings, Figure 1 is a diagrammatic, perspective illustration of means, at the picture window of the camera, for guiding the film, with pressure plate and motive mechanism;

Figure 2 shows, in top view, arrangement of the elements illustrated in Figure 1, within the camera casing;

Figure 3 is a cross-section along line III—III of Figure 2 through the means for guiding the film, the pressure plate and back wall of the camera;

Figure 4 shows, in cross-section along line IV—IV of Figure 2, the interior of the film pressure plate and the back wall of the camera;

Figure 7 is the view of the interior of a camera provided with film guide and film pressure plate, from the rear;

Figure 8 is a section along line VIII—VIII of Figure 7, through the rear part of the camera including the film pressure plate and back wall of the camera;

Figure 9 is a view similar to that shown in Figure 7 of a modified device for pressing the film against the window, and Figure 10 is a cross-section along line X—X through the rear part of the camera shown in Figure 9.

Figure 1:
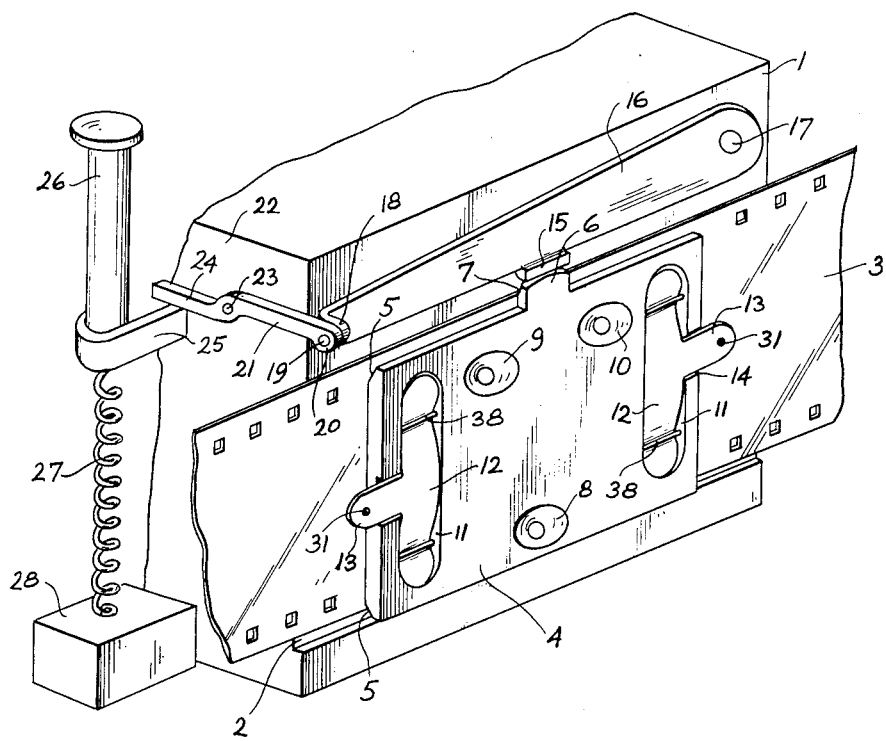

Referring now to the drawings in detail, in the embodiment shown in Figure 1, camera part 1 is provided with a recess 2, for guiding film 3, pressure plate 4 lying against film 3. Pressure plate 4 is bevelled at 5 at its upper and lower edge, on the side turned toward film 3. The upper edge of pressure plate 4 has a projecting portion 6, having a sloped surface 7 extending bevelled surface 5 of the pressure plate. The back side of pressure plate 4 is provided with 3 recesses 8, 9, 10, which have a longitudinal, e. g. elliptic form and wedge-shaped cross-section. A leaf spring 12 is inserted in each of two lateral recesses 11, said springs being held by cross pins 38 fastened to pressure plate 4. Springs 12 are bent, i. e. they are under initial tension, so that they urge plate 4 toward the back wall of the camera, said back wall being not shown in Figures 1 and 2. Springs 12, and through them pressure plate 4 too, are fastened to the back wall of the camera, by means of flap-shaped spring elements 13 which extend laterally at right angle and are arranged in lateral recesses 14 of plate 4. A projecting part 15 extending at right angle from lever 16, presses from above against projecting part 6 of pressure plate 4; said lever is pivotally fastened at one of its ends by bolt 17 and is capable of swinging in the direction of the plane of the film. The other end of lever 16 is provided with a portion 18, bent at right angle. This portion 18 is connected, by means of a pin 19, with one end 20 of a double-armed lever 21, which is pivotally fastened by means of bolt 23 to wall 22. The other end 24 of double-armed lever 21 rests on projection 25 of a vertically displaceable film control member 26, which is pressed upward to operative position by spring 27. The latter is supported on its other end by member 28 connected with the camera.

Figure 2 illustrates arrangement of the elements shown in Figure 1, within camera casing 29. Film 3 is advanced from film spool 30 to film spool 301, in conventional manner. For the sake of clarity, pressure plate 4, which covers the film, is shown separated from the back wall of the camera, which is not shown in this figure. Actually, pressure plate 4 is riveted by means of rivet holes 31 and rivets 32 to the back wall of the camera, which can be a hinged cover or a slidable part of the camera casing, as can be seen in Figure 4.

Figure 3 shows, in cross-sectional view, the mutual position of the elements. Film pressure plate 4 lies firmly against back wall 33 of the camera, under the effect of springs 12 described above. Conical heads 34 of rivets 35 fastened in camera back wall 33, engage wedge-shaped recesses 8, 9, 10, of pressure plate 4. In front of pressure plate 4, lies film 3 at picture window 36 and is guided on ledges 37 in film guide recess 2. Part 15 of lever 16, bent at a right angle, bears against projection 6 of pressure plate 4.

In the cross-sectional view of Figure 4, leaf springs 12 arranged in recesses 11 of pressure plate 4, are visible from the side. At their ends, these springs 12 are held by cross-pins 38 of the pressure plate. Lateral projections 13 of springs 12, which are clearly shown in Figure 2, are fastened to camera back wall 33 by means of rivets 32.

Figure 5:
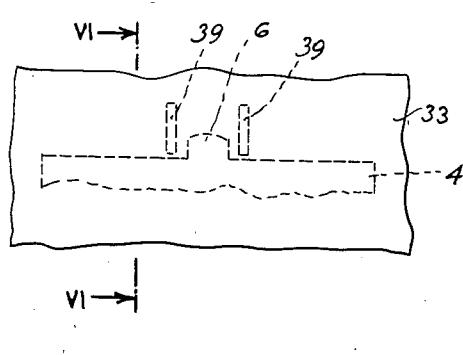
Figure 5 illustrates the back wall of the camera from the outside together with a portion of the pressure plate lying under it and two guide elements located on the back wall.
Figure 6:
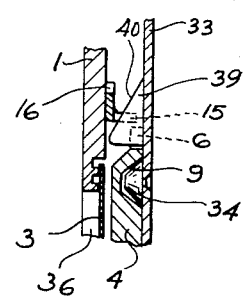
Figure 6 is a section along line VI—VI of Figure 5, through the back wall of the camera.

Figures 5 and 6 show the position of two guide elements 39 on a camera back wall 33, adapted to be slid to the camera. Guide elements 39 are fastened to back wall 33 on both sides of projection 6 of pressure plate 4. In cameras having a sliding back wall, inclined guide surfaces 40 of said guide elements 39, keep off the edge of film 3, which is not pressed against the window yet, from the edges of the pressure plate, in order to avoid damage to the film. Projecting part 6 of pressure plate 4 is not bevelled if a slidable camera back wall is used, as connection between bent end 15 of lever 16 and the upper edge of projecting part 6 takes place by said parts lying against each other, upon insertion of the sliding back wall of the camera.

The pressure plate is operated as follows:

If the back wall of the camera is open, i. e. slid off or swung open, owing to the initial tension of spring 12, pressure plate 4 lies firmly against back wall 33. Conical heads 34 of rivets 35 are then symmetrically housed in wedge-shaped recesses 8, 9, 10, of pressure plate 4. The film advancing mechanism housed by the camera, which, by itself, forms no part of the present invention, is under the action of spring 27. The latter presses control member 26 upward, i. e. into operative position. Thereby, projecting part 25 of member 26 exerts pressure from below on arm 24 of lever 21, so that end 20 of this lever 21, exerts pressure in downward direction. As this end 20 is connected with bent end 18 of lever 16, the latter is caused to swing downward about its pivotal point 17. If the camera has a back wall which is adapted to be clapped to closed position, then bent end 15 of lever 16 comes in contact during closing with projecting part 6 of the pressure plate, i. e. the lower edge of end part 15 abuts against bevelled surface 7 of projecting part 6 (see Fig. 1). As lever 16 is under spring impulse, pressure plate must give way and move downward until the lower surface of part 15 rests on the upper edge of projecting part 6. Thus, during pressing pressure plate 4 downward, in addition to its motion in parallel direction to the film, also a gliding movement of plate 4 takes place, because wedge-shaped recesses 8, 9, 10 of the plate, move along conical heads 34 of rivets 35, so that plate 4 is pressed away from back wall 33 in forward direction toward film 3.

If the camera has a sliding back wall, bevelling at 7 of projecting part 6 of plate 4 becomes unnecessary, as already mentioned above, because guided movement of pressure plate 4 and its projecting part 6, takes place anyhow in the same direction, in which bent part 15 and upper edge of projecting part 6 become engaged with each other. In this case, during closing the camera the previously described effect occurs, i. e. pressure plate 4 is pressed downward by lever 16, which is under spring impulse, and displacement of the pressure plate from the back wall and toward the film takes place. In this case, care must be taken that the edge of the film, which has not been pressed against the window yet, should not abut against edges of plate 4, upon insertion of the gliding back wall. In order to prevent this, guide members 39 (see Figures 5 and 6) are provided on back wall 33 on both sides of projecting part 6. Upon insertion of the back wall, the edge of film 3 is kept off from the edges of projecting part 6 of plate 4, by bevelled edges 40 of guide members 39 and held against film guide 2 of the camera. Therefore, pressure plate 4 presses film 3 against window 36 of the camera until member 26, which controls advance of the film, is not actuated. If it is desired to advance the film, member 26 is pressed downward and spring 27 is compressed. Simultaneously, arm 24 of lever 21 is separated from projecting part 25 of control member 26, i. e. lever 21 is disengaged. Thus, lever 16 can now move upward and will become disengaged over element 15 and projecting part 6, from pressure plate 4. Springs 12, which are arranged at pressure plate 4, try to draw the plate again toward back wall 33 of the camera. Plate 4 will now adjust itself with its wedge-shaped recesses 8 symmetrically with regard to heads 34 of rivets 35, i. e. it glides upward and lies against the back wall of the camera. Thus, the film is released simultaneously with transport of the film. When transport of the film is completed and member 26 returns to its upper position, spring 27 will act again on pressure plate 4, over member 25, and levers 21 and 16. By this action, plate 4 is pressed again against the film, in the manner described above.

Figure 8:
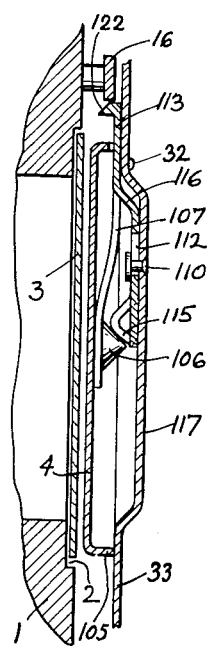
Figures 7–10 illustrate a modified embodiment of the invention.
Figure 7:
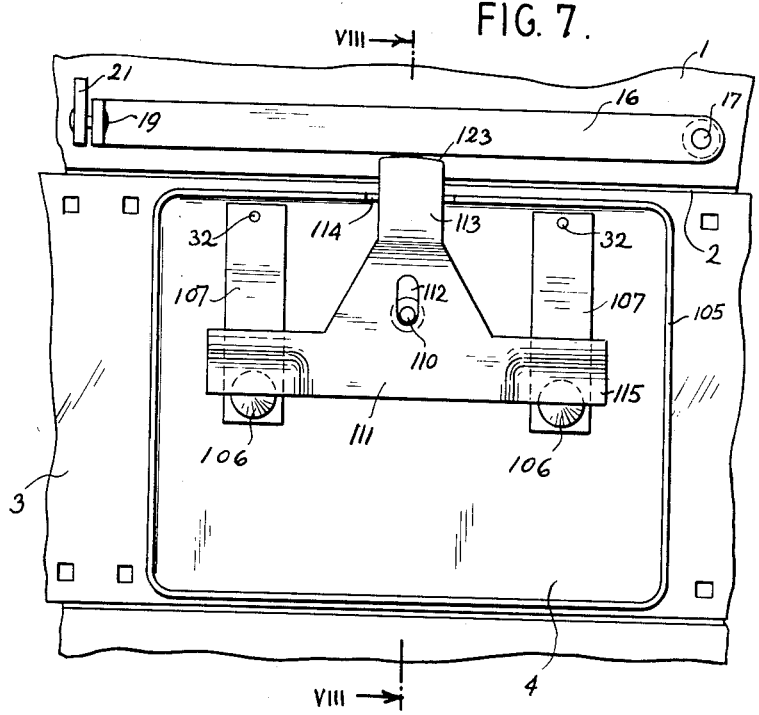

Referring now to the embodiment illustrated in Figures 7-10, in the camera shown in Figures 7 and 8, camera body 1 is provided with a guide 2 for film 3. The film is pressed against the window by pressure plate 4, which is provided with an edge portion 105 projecting toward the back wall of the camera. Two rivets 106 having pointed conical heads, are located in the centre-line of plate 4, and two leaf springs 107 are fastened to the plate at one of their ends by means of said rivets. These leaf springs are held, at their other end, at back wall 33 of the camera (see Figure 8), by means of rivets 32. A T-shaped slide 111 is guided on back wall 33 by means of rivet 110, said slide being provided with a centrally arranged longitudinal slot 112 surrounding said rivet, and capable of being displaced by the length of said slot 112. Arm 113 of slide 111 is guided by cut-out 114 of edge 105 of the plate. In the lower horizontal portion of slide 111, shown in Figure 7, said slide is bent at an angle to form inclined surfaces 115. The slide is bent at 116 so that it lies in a recess 117 of back wall 33 of the camera. Upper slide arm 113 is somewhat rounded at its free end at 123 and bears against the edge of a lever 16, which is pivotally fastened to camera body 1 at 17 and is actuated by means of rivet 19 through a cross lever 21, by an actuating member of the film control mechanism, not shown in the drawing. 122 denotes a bevelled surface on the rounded end of slide arm 113. This bevelled surface serves to prevent abutting of lever 16 upon closing back wall 33, so that said lever comes to rest on the projecting arch 123 of slide arm 113.

The device operates as follows:

Lever 21 is connected with the actuating member of the film transport so that the end of said lever 21, visible in Figure 1, exerts pressure in downward direction when the film is in rest position, i. e. in taking position of the camera. Thereby, lever 16, which is connected by rivet 19 with lever 21, is likewise caused to swing downward about pivot 17, so that a permanent pressure is exerted on arched portion 123 of slide arm 113. Figures 7 and 8 illustrate another position, i. e. the position in which advance of the film takes place. Lever 16 is thereby disengaged to such extent that slide 111 is under no pressure. Therefore, film pressure plate 4 is drawn by springs 107 toward back wall 33 of the camera and bears by its edge 105 against said back wall. Thereby, pointed conical rivet heads 106 have lifted slide 111 by means of its bevelled surfaces 115 from the film and pressed it upward, when viewed in the drawing. Thus, in the position shown in the drawing, film 3 is in film guide 2, i. e. not pressed by plate 4 and the film can advance freely. Upon termination of the film transport, pressure is exerted on slide 111 over lever 16, as described above. The slide is pressed downward and its bevelled surfaces 115 glide along the bevelled surfaces of conical rivet heads 106 and push pressure plate 4 forward toward film 3 and press the film against film guide 2. Thereby, pressure plate 4 moves forward and, as the plate is held by springs, it moves slightly upward, this latter movement corresponding to a distance depending on the length of the springs. If the distance between the back wall of the camera and the film guide is not uniform, and the deviation occurs in the upper or lower part of the drawing, the pressure plate will swing correspondingly about an axis which corresponds to an imaginary connecting line of conical rivet heads 106, until plate 4 lies fully against the picture window. If the deviation from a uniform distance is present between the left and right side in the drawing, the pressure of lever 16 will cause slide 111 to act on the respective rivet located on the side corresponding to the greater distance, for a longer period of time, than on the other side. In other words, slide 111 is not guided in completely parallel relation to the edges of the pressure plate, and it swings to some extent toward that side, on which plate 4 has to be pressed somewhat further forward to a uniformly pressed position. In order to attain this, upper opening 114 for arm 113 of slide 111 is made wide enough, in order to permit this slight lateral swinging. The same effect of fully pressing the plate is also obtained if the non-uniform distance between the film guide and the back wall of the camera is not limited to two opposite sides, and an unsymmetrical spacial position between the parts occurs. In this case, pressing of plate 4 is also adjusted by a combined pressing motion, which corresponds to those described above.

Figure 10:
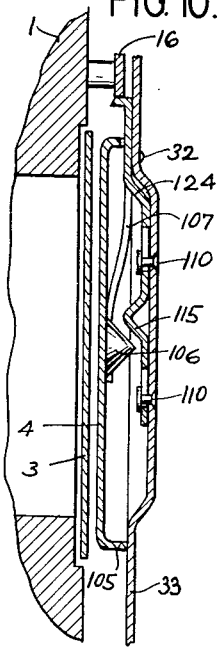
Figure 9:
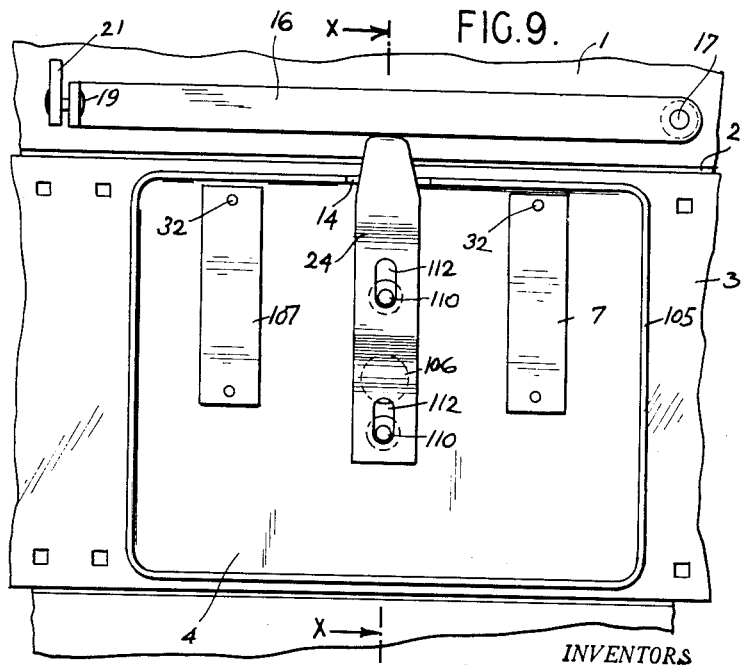

The device illustrated in Figures 9 and 10 is similar to that shown in Figures 7 and 8. The individual elements are in general the same and their description need not be repeated here. However, as pressing element, only one pointed conical rivet head 106, which is fastened to pressure plate 4, and a slide 124, which is movable on back wall 33 of the camera in two guide elements 112 and is correspondingly narrower, are used here. Operation of the device is also substantially similar to that of the device illustrated in Figures 7 and 8. Upon swinging and pressing lever 16, slide 124 is caused to move downward on back wall 33 of the camera. It presses plate 4, over the conical head of rivet 106, forward against film 3. In the case of non-uniform distance between film guide 2 and back wall 33 of the camera, pressure plate 4 adjusts itself by a corresponding swinging about the point of contact of rivet 106, so that it uniformly bears against film 3 and film guide 2.

Operation of the film transport means from member 26 is effected by conventional means, for example in the manner shown in German Patents 611,589 or 720,916, in which transport of the film is brought about by pressing down member k (see German Patent 611,589) or control lever 12 (see German Patent 720,916).

The term "wedge-shaped" is used in the present application to denote the design of recesses 8, 9, 10 (Figures 1–3). These recesses are V-shaped in cross-section. Their form substantially corresponds to the form of conical heads 34, which are in engagement with said recesses 8, 9, 10, i. e. the recesses are likewise of conical shape. The term "wedge-effect" is used in the present application to denote the effect of a gliding movement between the lateral walls of recesses 8, 9, 10, on the one hand, and the conical surfaces of heads 34, on the other hand, when pressure plate 4, provided with said recesses 8, 9, 10, is moved perpendicularly to the direction of pressing plate 4 relative to stationary heads 34. This movement which first occurs in the action of lever 16 upon plate 4 and the direction of which is indicated by an arrow in Figure 3, is diverted transversely relative to said first direction, i. e. in the direction toward the film, as a result of the "wedge-effect."

It will be understood that the present invention is not limited to the elements, steps, constructions and other details specifically described above and shown in the drawings, and can be carried out with various modifications without departing from the scope of the invention, as defined in the appended claims.

What is claimed is:

1. A roll-film camera comprising a film pressure plate adapted to be pressed in its operative position against the film to be exposed, and to be lifted from the film to released position during transport of the film within the camera, and means for controlling transport of the film; means for causing displacement of the pressure plate from operative position to released position, and vice versa, by a combined movement (a) substantially perpendicularly to the plane of the film, and (b) substantially parallel with said plane, said means for causing displacement of the pressure plate, being actuated by the means for controlling transport of the film and comprising transmission means which is coupled with the pressure plate in closed position of the camera back wall and is uncoupled from the pressure plate upon removal of the camera back wall from its closed position; the pressure plate being elastically fastened to the back wall of the camera, and the pressure plate, on the one hand, and the camera back wall, on the other hand, are provided with recesses and registering projections having a wedge effect.

2. A roll-film camera comprising a film pressure plate adapted to be pressed in its operative position against the film to be exposed, and to be lifted from the film to released position during transport of the film within the camera, and means for controlling transport of the film; means for causing displacement of the pressure plate from operative position to released position, and vice versa, by a combined movement (a) substantially perpendicularly to the plane of the film, and (b) substantially parallel with said plane, said means for causing displacement of the pressure plate, being actuated by the means for controlling transport of the film and comprising transmission means which is coupled with the pressure plate in closed position of the camera back wall and is uncoupled from the pressure plate upon removal of the camera back wall from its closed position; the pressure plate being elastically fastened to the back wall of the camera and provided with wedge-shaped recesses on its surface turned to the camera back wall, while the camera back wall is provided with rivets having conical heads, adapted to engage said recesses.

3. A roll-film camera comprising a film pressure plate adapted to be pressed in its operative position against the film to be exposed, and to be lifted from the film to released position during transport of the film within the camera, and means for controlling transport of the film; means for causing displacement of the pressure plate from operative position to released position, and vice versa, by a combined movement (a) substantially perpendicularly to the plane of the film, and (b) substantially parallel with said plane, said means for causing displacement of the pressure plate, being actuated by the means for controlling transport of the film, said controlling means being coupled with the pressure plate in closed position of the camera back wall and uncoupled from the pressure plate upon removal of the camera back wall from its closed position, at least one means, having sloping surface, being provided, between the pressure plate and the back wall of the camera, for causing movement of and supporting the pressure plate, while allowing the latter to swing, during its motion toward the film.

4. A roll-film camera comprising a film pressure plate adapted to be pressed in its operative position against the film to be exposed, and to be lifted from the film to released position during transport of the film within the camera, and means for controlling transport of the film; means for causing displacement of the pressure plate from operative position to released position, and vice versa, by a combined movement (a) substantially perpendicularly to the plane of the film, and (b) substantially parallel with said plane, said means for causing displacement of the pressure plate, being actuated by the means for controlling transport of the film and comprising transmission means which is coupled with the pressure plate in closed position of the camera back wall and is uncoupled from the pressure plate upon removal of the camera back wall from its closed position, at least one means, having sloping surface, being provided, between the pressure plate and the back wall of the camera, for causing movement of and supporting the pressure plate, while allowing the latter to swing, during its motion toward the film.

5. A roll-film camera comprising a film pressure plate adapted to be pressed in its operative position against the film to be exposed, and to be lifted from the film to released position during transport of the film within the camera, and means for controlling transport of the film; means for causing displacement of the pressure plate from operative position to released position, and vice versa, by a combined movement (a) substantially perpendicularly to the plane of the film, and (b) substantially parallel with said plane, said means for causing displacement of the pressure plate, being actuated by the means for controlling transport of the film, said controlling means being coupled with the pressure plate in closed position of the camera back wall and uncoupled from the pressure plate upon removal of the camera back wall from its closed position, the pressure plate being provided with at least one means having sloping surface, for causing movement of and supporting the pressure plate, while allowing the latter to swing during its motion toward the film, said means having a sloping surface being located in the space between the pressure plate and the back wall of the camera.

6. A roll-film camera as claimed in claim 4, in which the means having sloping surface consists of a conical projection.

7. A roll-film camera as claimed in claim 4, in which the means having sloping surface consists of a conical projection located substantially in the center of the pressure plate.

8. A roll-film camera as claimed in claim 4, in which the means having sloping surface comprise at least two members having sloped surfaces, and arranged in substantially straight line.

9. A roll-film camera as claimed in claim 4, in which the means having sloping surface comprise at least two members having sloped surfaces, and arranged in substantially straight line located symmetrically relative to the pressure plate.

10. A roll-film camera as claimed in claim 4, in which the pressure plate is under the action of at least one spring urging the pressure plate toward the back wall of the camera.

11. A roll-film camera as claimed in claim 4, in which the pressure plate is under the action of at least one leaf spring urging the pressure plate toward the back wall of the camera.

12. A roll-film camera as claimed in claim 4, comprising a transmission member arranged between the pressure plate and back wall of the camera, said transmission member consisting of a slide provided with projections for acting on said means having sloping surface.

13. A roll-film camera as claimed in claim 4, comprising a transmission member arranged between the pressure plate and back wall of the camera, said transmission member consisting of a slide provided with sloped projections for acting on said means having sloping surface.

14. A roll-film camera as claimed in claim 4, in which the means having sloping surface comprises a rivet provided with a conical head, said rivet being fastened to the pressure plate.

References Cited in the file of this patent

UNITED STATES PATENTS

| | | |
|---|---|---|
| 1,827,464 | Denniss et al. | Oct. 13, 1931 |
| 1,829,332 | Beck | Oct. 27, 1931 |
| 1,864,100 | Steiner | June 21, 1932 |
| 1,987,254 | Goldhammer | Jan. 8, 1935 |
| 2,039,517 | Black | May 5, 1936 |
| 2,266,426 | Koszalka et al. | Dec. 16, 1941 |
| 2,336,279 | Mihalyi | Dec. 7, 1943 |
| 2,629,301 | Knauf | Feb. 24, 1953 |